(12) United States Patent
Madden (10) Patent No.: US 11,189,158 B1
(45) Date of Patent: Nov. 30, 2021

(54) SYSTEM AND METHOD FOR IMPROVING HAND SANITATION IN CUSTOMER-FACING ENVIRONMENTS

(71) Applicant: David H. Madden, Portland, OR (US)

(72) Inventor: David H. Madden, Portland, OR (US)

(*) Notice: Subject to any disclaimer, the term of this patent is extended or adjusted under 35 U.S.C. 154(b) by 0 days.

(21) Appl. No.: 16/878,526

(22) Filed: May 19, 2020

(51) Int. Cl.
| | |
|---|---|
| *G06F 21/62* | (2013.01) |
| *G08B 21/24* | (2006.01) |
| *H04W 4/02* | (2018.01) |
| *G06Q 20/20* | (2012.01) |
| *G08B 5/36* | (2006.01) |

(52) U.S. Cl.
CPC ......... *G08B 21/245* (2013.01); *G06Q 20/201* (2013.01); *G08B 5/36* (2013.01); *H04W 4/02* (2013.01)

(58) Field of Classification Search
CPC ...... G08B 21/245; G08B 5/36; G06Q 20/201; H04W 4/02
See application file for complete search history.

(56) References Cited

U.S. PATENT DOCUMENTS

2017/0044747 A1\* 2/2017 Louis ...................... E03C 1/046

\* cited by examiner

*Primary Examiner* — Hongmin Fan
(74) *Attorney, Agent, or Firm* — Mersenne Law (57) ABSTRACT

Retail establishment operators can improve public health and interdict disease transmission chains by operating a hand-hygiene compliance monitoring system having hand-hygiene monitors carried by customers and hand-sanitization stations distributed throughout the store. Hand-hygiene monitors display a visible indication of the length of time since a customer last cleaned his hands; the visible indication is updated when the customer interacts with a hand-sanitization station. A store can encourage the use of this system by offering an incentive, such as a discount on store merchandise, to customers who frequently clean their hands while shopping in the store. Methods to prevent interference or abuse of the system are also described.

7 Claims, 5 Drawing Sheets

SYSTEM AND METHOD FOR IMPROVING HAND SANITATION IN CUSTOMER-FACING ENVIRONMENTS

CONTINUITY AND CLAIM OF PRIORITY

This is an original U.S. patent application.

FIELD

The invention relates to electronic communication, monitoring and data collection systems having a personal, portable component and one or more stationary components which interact to collect time, location and activity information. More specifically, the invention relates to systems for monitoring and displaying indications of human behavior to others, to engage social pressure for improving compliance with behavioral guidelines and requirements.

BACKGROUND

Simple, basic hygiene practices such as hand-washing are known to have surprisingly large beneficial effects on public-health outcomes. Although any particular instance of a person washing his hands may not be traceable to a specific infection avoided, it is certain that an overall increase in the frequency of hand sanitation helps to prevent infection and interrupt transmission chains. It is also important to encourage regular hand sanitation across a broader proportion of the population, rather than simply increasing the frequency of regular hand-washers' cycles while infrequent washers continue to shirk their responsibilities.

Systems for encouraging regular hand sanitation in healthcare environments are known in the art (see, e.g., the present inventor's U.S. Pat. Nos. 9,564,038 and 10,121,356). However, recent events have exposed a need for devices and operational paradigms that can extend the benefits of these healthcare-oriented systems to a wider range of installations. In particular, improving hand sanitation among the general public in areas where many people come into indirect hand-to-hand contact may have substantial benefits. Embodiments of the invention address this need.

SUMMARY

Embodiments of the invention extend the functionality of the hand-hygiene compliance monitors and system described in the inventor's prior work. The compliance monitors having visual indicators of hand-sanitation timing are used to encourage proper hand hygiene among customers at a retail establishment.

A customer wears a hand-hygiene compliance monitor while shopping in a store. The monitor displays—to other customers—an indication of the length of time since the customer last cleaned his hands. Hand sanitization stations transmit a message to the monitor to cause it to update its display each time the customer cleans his hands. The system collects information about the customer's hand hygiene, and an incentive such as a discount on items purchased may be offered to the customer on checkout, provided that the customer met the store's targets for frequency of hand sanitization.

DETAILED DESCRIPTION

The canonical environment contemplated for the present invention is a retail store with substantial customer traffic—for example, a grocery store. This environment is a nexus for person-to-person encounters (customers travel about the store, collecting the products they seek, and coincidentally crossing paths with other customers). It is also a nexus for indirect hand-to-hand encounters, when one customer picks up a product to examine it, but decides to return the product to the shelf, and (often shortly thereafter) another customer picks up the same product.

As a result, retail stores can be significant exchange points for person-to-person disease transmission, whether transmission occurs by airborne particles or by fomites. Embodiments of the present invention encourage and incentivize regular hand sanitation to interrupt (or at least to weaken) transmission chains that arise in these environments.

Figure 1:
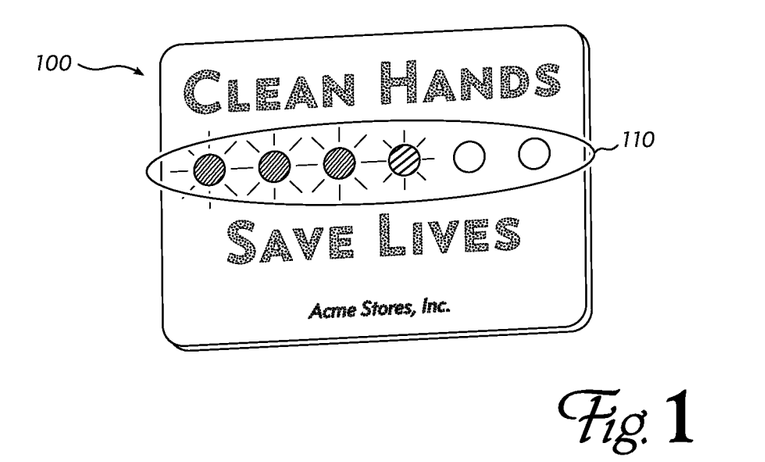
FIG. 1 shows a sample hand hygiene compliance monitor according to an embodiment of the invention.

FIG. 1 shows a portable hand-hygiene compliance monitor 100 that may be used with an embodiment of the invention. The device may be similar to a name tag (often a flat oblong object about the size and shape of a credit card (e.g., an ISO/IEC 7801 ID-1 card). It may include a mechanism or fitting for securing the card to a person's clothing, or may be designed to be suspended from a lanyard connected to the person. An important characteristic of the monitor is that it is visible to others when worn as intended.

Figure 2:
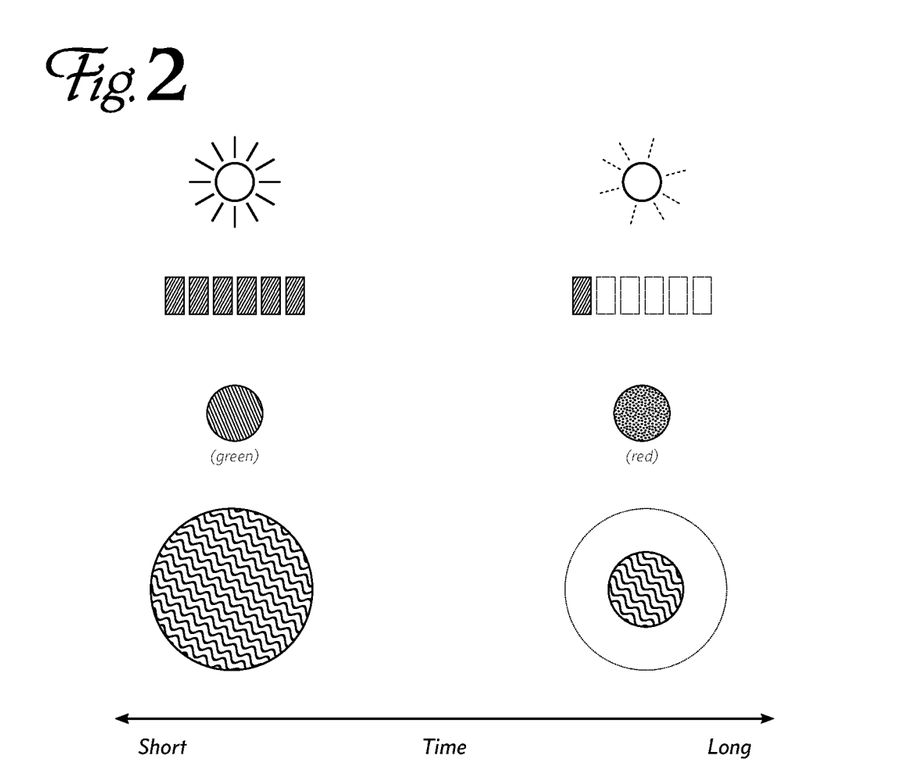
FIG. 2 shows several example displays that may be used to indicate the passage of time to a viewer.

The monitor displays a visual indication 110 that is proportional to a length of time. The indication may be, for example, a color (i.e., a color change from green to red or an intensity change from bright to dim), an amount (e.g., a needle gauge similar to a fuel gauge, a bar graph or an illuminated area) or a higher-frequency dynamic display (i.e., a blinking or flashing indicator, where the rate of blinking corresponds to the length of time). FIG. 2 shows some example visual indicators, with the left-hand illustrations corresponding to a brief length of time, and the right-hand illustrations corresponding to an extended length of time.

The monitor also comprises a wireless signal receiver, which may be, for example, an infrared receiver or a radio-frequency receiver. This receiver need not be apparent or visible to the user, but it must be capable of receiving signals transmitted wirelessly from a nearby device (the nature of which will be described shortly). Finally, the monitor preferably includes a wireless transmitter, ideally of a similar type to the wireless signal receiver, so that one monitor device can communicate with another monitor device it encounters as the individuals wearing them move about the environment.

Figure 3:
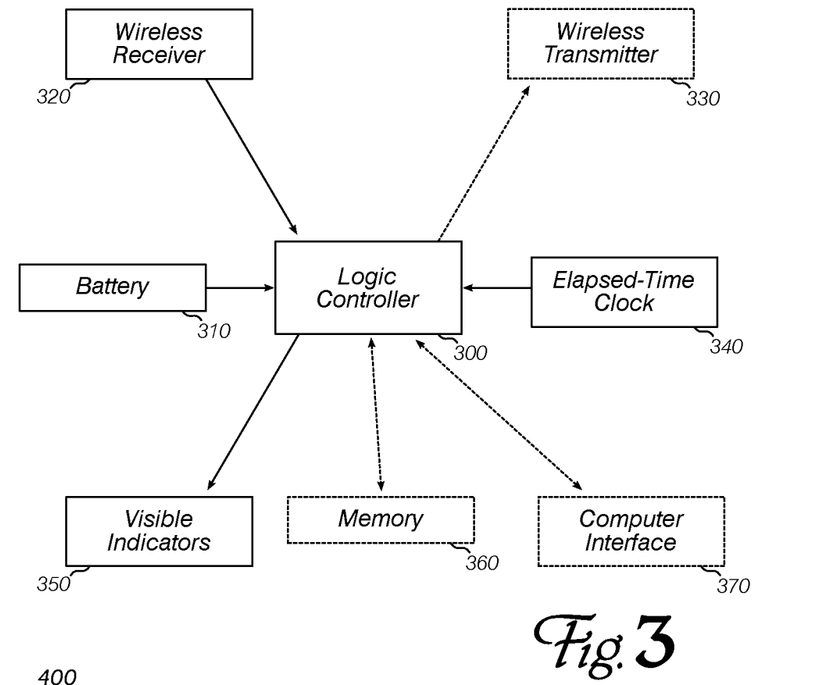
FIG. 3 is a block diagram showing several functional components present in a hand hygiene compliance monitor.

FIG. 3 is a block diagram of the functional components of a hand-hygiene compliance monitor device. The heart of the device is a logic controller 300, which may be a microcontroller, programmable processor, programmable logic array ("PLA"), or similar device. A battery 310 provides power for the logic controller and other subsystems. The monitor includes a wireless receiver 320, and may include a wireless transmitter 330, as discussed above. An elapsed-time clock 340 is provided so that the logic controller 300 can activate the visible indicator(s) 350 to show the indication of the length of time. A memory 360 stores information about the device's activities. Finally, a computer interface 370, such as a Universal Serial Bus ("USB") interface, may be provided so that information may be uploaded from or downloaded to the device. (A USB interface also allows charging of the battery 310 when connected.)

The elapsed-time clock 340 need not be calibrated in any particular time unit, such as a second or a minute. It also need not be synchronized to real time ("wall-clock time"). If a calibrated or synchronized clock is available, the hand-hygiene compliance monitor can collect and report more useful data, but for its basic function, the device can use a simple periodic counter or even an analog resistor-capacitor timing circuit.

Figure 4:
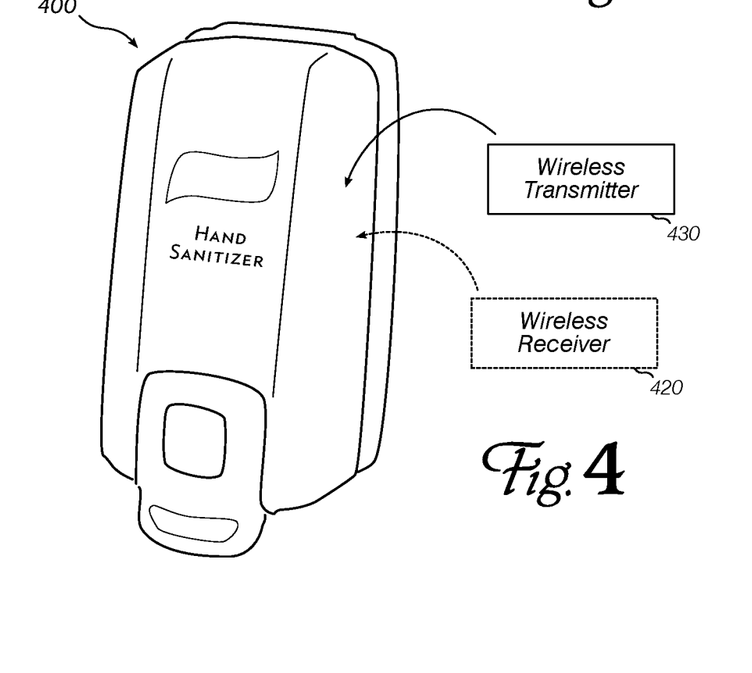
FIG. 4 shows a sample hand sanitization station.

A second element of the inventive system is a hand-sanitization station, FIG. 4 generally at 400. This device comprises a component that is effective to reduce hand contamination by some means. For example, the hand-hygiene station may include a hand-sanitizer dispenser (releasing a suitable quantity of soap, alcohol gel, detergent, antibacterial soap or detergent, or a similar substance); or an ultraviolet light source (protected from illuminating its users' eyes) that can inactivate or destroy pathogens on the user's hands. Some embodiments may include both a sanitizer dispenser and a sterilizing light source.

In addition, the hand-sanitization station 400 comprises a wireless transmitter 430 that can send a signal to the logic controller 300 of a nearby monitor device via the monitor device's wireless receiver 320. For example, the wireless transmitter 430 may be an infrared transmitter or a radio transmitter. The hand-sanitization station may also include a wireless receiver, 420, so that the station can exchange messages with a hand-hygiene compliance monitor (rather than simply send a message to the monitor).

The hand-sanitization station should transmit a signal to a nearby hand-hygiene monitor when the hand-sanitization station is activated to perform a sanitizing operation. For example, when the suitable quantity of sanitizer is dispensed or when the sterilizing light source is activated, a signal is transmitted to notify the nearby monitor of this activity. The monitor, upon receiving this signal, modifies its behavior as discussed below.

Figure 5:
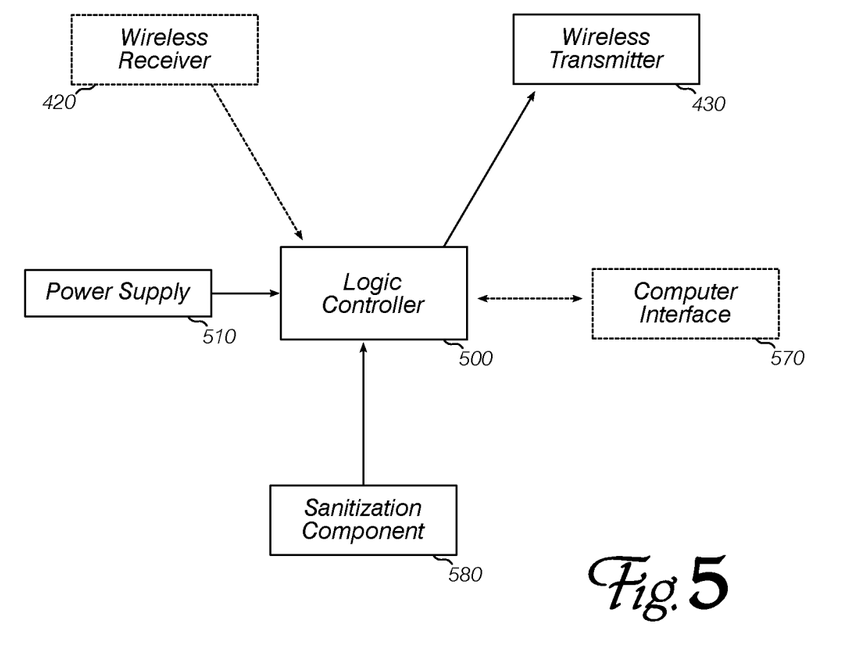
FIG. 5 is a block diagram showing several functional components present in a hand sanitization station.

FIG. 5 shows a block diagram of some of the elements of a hand-sanitization station according to an embodiment. In addition to the sanitization component 580, the wireless transmitter 430 and the optional wireless receiver 420 mentioned above, the hand-sanitization station may comprise a logic controller 500, such as a microcontroller, programmable processor, PLA, or similar device. Most devices will include a power supply 510, and some will include a computer interface 570. A real-time clock, memory, computer interface, or other elements similar to those in a hand-hygiene compliance monitor may also be present. These elements may permit (or improve) the device's capacity to participate in the overall system described.

Figure 6:
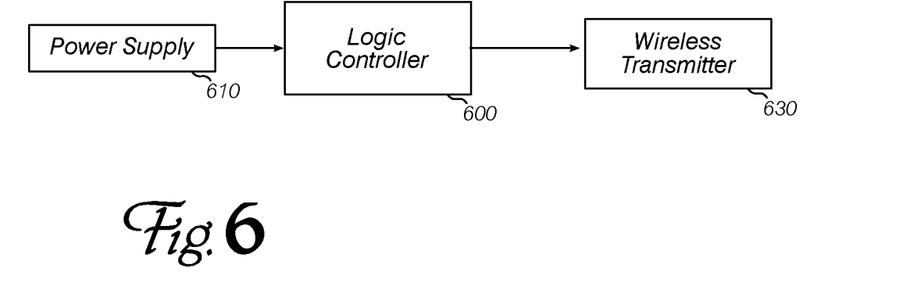
FIG. 6 is a block diagram showing several functional components present in a location beacon.

A system may include location beacons, which have capabilities similar to the signaling portion of a hand-sanitization station, but which need not include the sanitizing function. FIG. 6 shows a block diagram of a location beacon, including a logic controller 600, a power supply 610, and a wireless transmitter 630. Location beacons may be placed at positions of interest, and may transmit messages to nearby hand-hygiene compliance monitors. When received, the hand-hygiene compliance monitor should record the message (and time), and may alter its time-elapsed display in a suitable way. For example, a location beacon placed in a restroom may cause the hand-hygiene compliance monitors of customers who enter the restroom to immediately revert to a "hands not clean" indication, which can only be cleared by accessing and activating a hand-sanitization station thereafter.

A final component is present in many (but not necessarily all) embodiments of the system described here. This is a general-purpose computing system, configured with instructions and data to coordinate, facilitate or expedite the important interactions among other components (principally the hand-hygiene compliance monitors and the hand-sanitization stations). This computing system may be used to configure and monitor the activities of the other components; to collect, analyze and report data about the system's operations; and to coordinate activities in one system (e.g., at one retail establishment) with the activities occurring at other installed systems. These "control center" functions can be considered "glue logic" that ties the parts of the system together.

Figure 7:
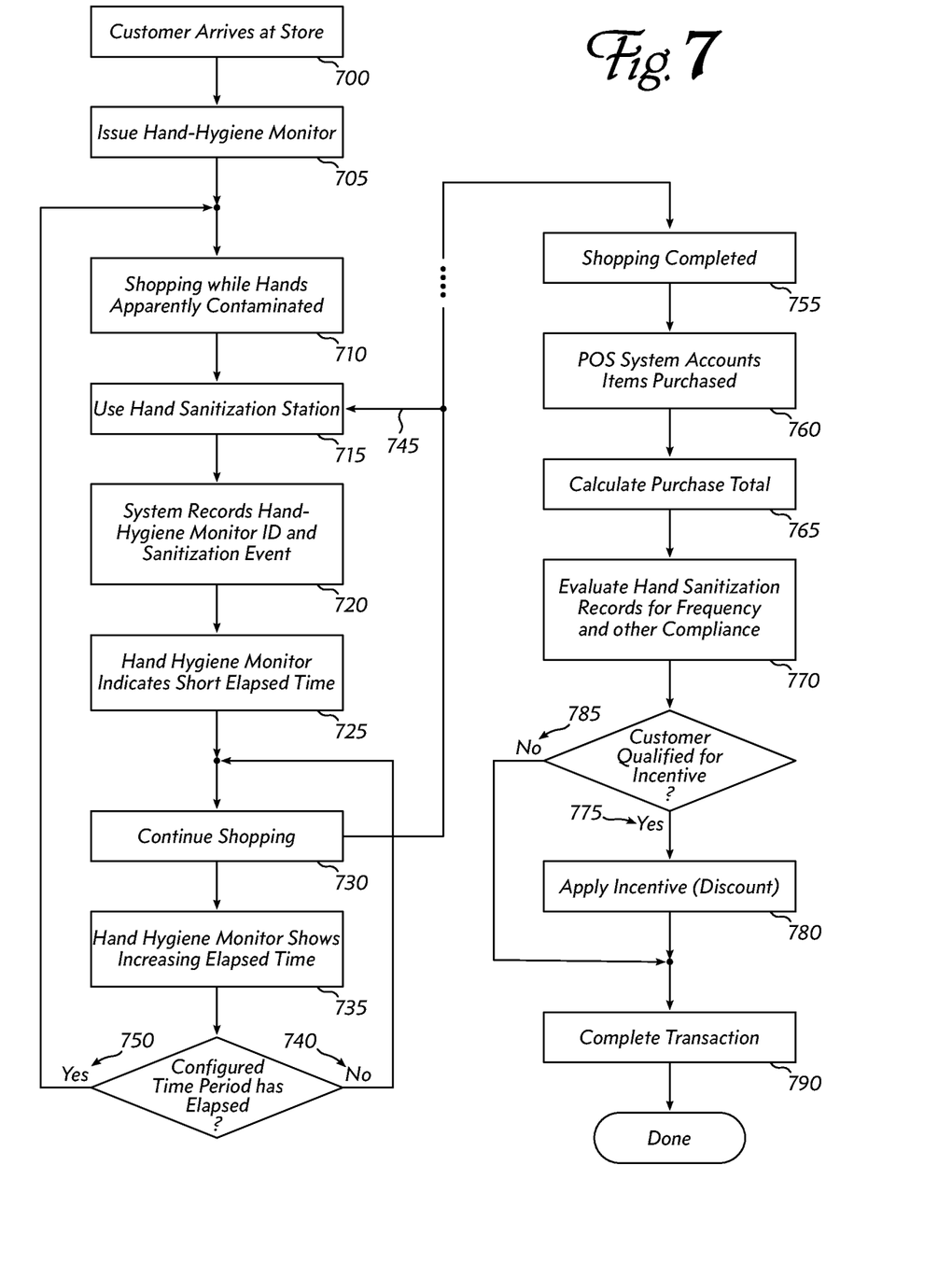
FIG. 7 is a flow chart showing an overview of system operation.

FIG. 7 outlines interactions among system components that may occur during a typical use. Again, the canonical use case for a system is to protect public health by reducing person-to-person and via-fomite disease transmission in multi-customer commercial environments such as grocery and other retail stores.

A customer arrives at a store (700) and is given a hand-hygiene compliance monitor (705). Customers may also bring their own monitors, provided that these devices can interact with the store's hand-sanitization stations as described here. The monitor initially displays a "long time" indication, showing that the customer has not washed or sanitized his hands since arriving at the store. If the customer begins shopping immediately, it will appear to other customers that he is doing so while his hands are presumably contaminated (710).

The store should provide a hand-sanitization station near its entrance, and may encourage newly-arrived customers to clean their hands upon entry. If the customer uses the hand-sanitization station (715), the system will record the hygiene-monitor ID and the sanitization event (720) and the monitor will change its display to indicate "short elapsed time" (725)—i.e., the customer has just sanitized his hands.

Thereafter, the customer may move about the store as desired, searching for, examining, and selecting products (shopping) (730). During this time, his monitor will adjust its display to indicate the increasing amount of time that has elapsed since the customer sanitized his hands (735). If the configured time period has not elapsed (740), the customer may simply continue shopping (730) while his hand-hygiene compliance monitor continues its countdown (735). At any time (745) the shopper can use a nearby hand-sanitization station (715) to reset his hand-hygiene monitor's display. The system records these sanitization events as well (720).

If the configurable time period has elapsed (750), the display will return to its initial state, suggesting that a long time had elapsed since the customer sanitized his hands (710). This display may be visually indistinguishable from the display accompanying a customer who had never cleaned his hands after arriving at the store. It is important in an embodiment that this indication be visible to other shoppers. The time period over which the display changes from "short time" to "long time" may be set by the store when the customer arrives.

The store should provide hand-sanitization stations at suitable locations throughout the retail space, and a customer engaged in shopping may be encouraged to clean his hands regularly during his visit. When the shopper cleans his hands, the hand-sanitization station used will transmit a signal to the customer's monitor, and the monitor will update its display to indicate "short time"—i.e. that the customer has just (re-)sanitized his hands. This may occur regularly during the shopper's visit.

Finally, when the customer has collected the items he desired (755), he may bring them to a check-out area in the store. This may be an attended cash register or a self-checkout register (commonly known as a "point of sale" or "POS" system). The POS system accounts for the items collected during the customer's shopping trip (760) and calculates a purchase total (765). The system also evaluates hand sanitization records collected during the shopping trip to determine whether the customer met benchmarks determined by the store to obtain an incentive (770). If the customer did satisfy the store's requirements (775), then the POS system may apply an incentive (for example, it may apply a discount to the purchase total) (780). If the customer did not clean his hands as often as the store desired (785), he may receive no incentive or discount.

The POS system completes the transaction with the customer (790), who may now return the hand-hygiene compliance monitor and leave the store.

The hand-sanitization records may be collected by the hand-hygiene monitor device and reported by it to the POS system at checkout, or the information may be collected by other components in the system, such as the hand sanitization stations and/or location beacons, which may report the information to the POS system through an alternate channel. This information may include, for example, the times at which the customer cleaned his hands, the elapsed times between cleanings, the locations of the hand-sanitization stations used, the locations of hand-sanitization stations that the customer passed but did not use, location beacons in the store that the customer passed, and identifiers of other customer's monitors that the current customer encountered (and the times and possibly locations within the store of those encounters). This information may be correlated with product information from the point-of-sale system ("cash register") to help the store position products, hand-sanitation stations and general store layout in an improved configuration for protecting health and impairing disease transmission. The information may also be helpful in contact tracing, to locate individuals who encountered or interacted with an infected person at the store.

The information from the hand-hygiene monitors and other devices may be evaluated to determine whether the customer's behavior at the store met benchmarks or targets set by the store. For example, the store may wish to encourage customers to clean their hands before entering each aisle, to clean them at least every n minutes (for example, every 3 minutes), or to clean them within n seconds of encountering another customer in the store.

Anti-Tampering, Anti-Griefing

It is appreciated that citizens of certain countries and localities evince an unconventional view of the value of public hygiene. These individuals sometimes adopt an inexplicably hostile stance to systems of the present type, somehow believing that the use of such systems infringes the individuals' rights. It should thus be expected that some effort will be devoted to circumventing or sabotaging systems designed to protect and improve public health. A system according to an embodiment should anticipate and be resistant to such attacks. A variety of challenges and workable responses are described here.

As an initial matter, it should be recognized that an embodiment operates via cooperation among systems having general-purpose computing capability. Thus, cryptographic approaches to preventing these attacks are both possible and effective. The techniques described below presume that hand-hygiene compliance monitors and hand-sanitization stations include wireless transmission facilities as well as wireless reception, so that they can communicate bidirectionally with other devices in the store. Further, the hand-hygiene monitors are presumed to have sufficient memory to store identifiers of at least a few other devices, and to be able to transmit those identifiers when queried, using a protocol that permits validation of sender and message.

Figure 8:
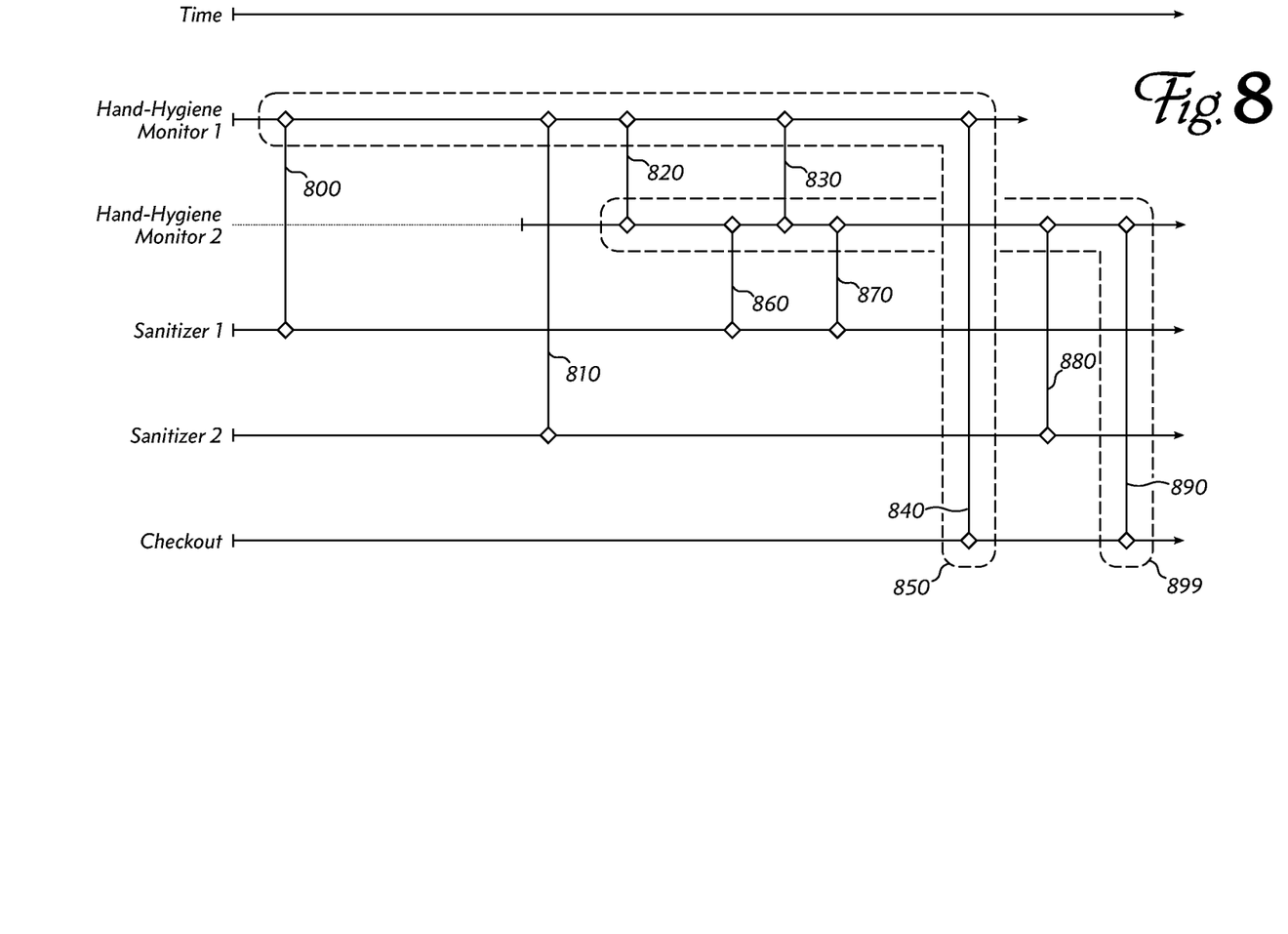
FIG. 8 is a timeline showing interactions among several devices cooperating to implement an embodiment of the invention.

FIG. 8 shows some example interactions between system participants to illustrate the character of data that may be available to detect or prevent tampering. The timeline shows two customers' shopping trips. Customer 1, using hand-hygiene compliance monitor 1, arrives at the store first. He immediately cleans his hands at hand-sanitization station 1, yielding event records 800 (both the monitor and the sanitizer may record the interaction). Later, customer 1 cleans his hands again at hand-sanitization station 2, yielding event records 810. Customer 2 (using hand-hygiene compliance monitor 2) arrives and the customers pass each other in an area of the store, yielding event records 820 (each monitor records that it observed the other). Customer 2 uses sanitizer 1, 860, and then the customers pass each other again, 830. Customer 2 uses sanitizer 1 again, 870.

Now Customer 1's shopping trip is complete, so he moves to the checkout, 840, where his monitor may report the event data contained within region 850. Customer 2 continues shopping, using sanitizer 2 after Customer 1 leaves (880). Customer 2's shopping trip is over at 890, and her monitor may report the event data contained within region 899.

Note that the store's central-processing system can evaluate the data from Customer 2's monitor, 899, by comparing it with the data 850 received earlier from Customer 1's monitor. If Customer 2's monitor reports interactions that are incompatible with the interactions reported by Customer 1, it may suggest that Customer 1 or Customer 2 is attempting to evade the hand-hygiene compliance system. More generally, with many customers' data, the store can detect tampering fairly reliably.

Fake Sanitization Monitors

One simple attack is for a customer to display a fake hand-hygiene monitor, for example one which always shows that the customer's hands have just been cleaned. This may be difficult for other customers to detect visually, but the store (having access to interaction records from the hand-sanitization stations, location beacons, and other data) can determine that the customer did not interact with any hand-sanitization stations and may choose to deny this customer any corresponding incentive, or may exclude the customer from its premises entirely in the future. This attack can also be prevented simply by disallowing the use of customer's-own monitors (i.e., by requiring customers to use the store's own, branded hand-hygiene compliance monitors).

Fake Sanitizing Stations

An attacker may transmit wireless signals designed to cause other customers' monitors to display incorrect indications (to embarrass those customers for appearing not to be cleaning their hands appropriately, or to cause the store to deny them the incentive for participating). However, if the store's legitimate devices (hand-sanitizing stations and other transmitters) use public-key cryptography to transmit messages signed by the store's private key, then the attacker will be unable to spoof legitimate messages. (Private-key signatures are often called "electronic signatures" or "e-signatures.") The store's public key (for validating legitimate messages) may be configured into the store's own hand-hygiene compliance monitors which are loaned to customers for the duration of their visits, or the public key may be transmitted to a customer's hand-hygiene monitor if he brings one of his own. If a monitor receives an unsigned or improperly-signed message, it may ignore it (or record and report the message later to assist the store in tampering detection).

Replay/Hijack Attacks

An attacker may attempt to receive and copy messages between a hand-sanitization station and the hand-hygiene compliance monitor of a legitimate user. If successful, the attacker might be able to claim that he had cleaned his hands more often than he actually did. This attack can be prevented by implementing a bidirectional protocol between station and monitor: when a legitimate user activates a hand-sanitization station, the devices conduct a brief, two-way conversation so that the station obtains the identification of the monitor (and vice-versa), and the station provides a token indicating that the holder of the specific hand-hygiene compliance monitor (and not the eavesdropping-attacker's monitor) was present and participated in the transaction with the sanitization station.

General Surveillance and Data Correlation

The components cooperating to implement an embodiment of this invention can collect data passively that makes it much more difficult for an attacker to interfere with the system's operation. The same data make it easier to detect tampering attempts. Legitimately-participating devices may transmit their identifications periodically (preferably using a cryptographically-signed, timestamped and serialized format) that can be received and recorded by other participating devices (both the mobile hand-hygiene monitors carried by other customers, and the usually stationary hand-sanitization stations and location beacons). When a customer brings a hand-hygiene monitor to a check-out after shopping, all of this data may be uploaded to the store's central control system where it can be correlated with data collected from other devices. The data should be largely consistent (e.g., if customer 1's monitor encountered customer 2's monitor, then customer 2's monitor should report encountering customer 1's monitor, and both reports should be temporally near a report from a common location beacon.) Customers whose monitors upload significantly conflicting data, or no data at all, are likely to be attempting to thwart the system unless a hardware failure or other cause is apparent.

An embodiment of the invention may be a machine-readable medium, including without limitation a non-transient machine-readable medium, having stored thereon data and instructions to cause a programmable processor (or a group of two or three processors in cooperation) to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a non-transient machine-readable medium storing data and instructions to perform some of the operations discussed above. Compiling (if necessary) and executing such an embodiment at the receiver may result in the receiver performing operations according to a third embodiment.

In the preceding description, numerous details were set forth. It will be apparent, however, to one skilled in the art, that the present invention may be practiced without some of these specific details. In some instances, well-known structures and devices are shown in block diagram form, rather than in detail, in order to avoid obscuring the present invention.

Some portions of the detailed descriptions may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, including without limitation any type of disk including floppy disks, optical disks, compact disc read-only memory ("CD-ROM"), and magnetic-optical disks, read-only memories (ROMs), random access memories (RAMs), erasable, programmable read-only memories ("EPROMs"), electrically-erasable read-only memories ("EEPROMs"), magnetic or optical cards, or any type of media suitable for storing computer instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will be recited in the claims below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that systems to monitor and encourage proper hand sanitization and hygiene in a retail environment can also be produced by software and hardware that distribute the functions of embodiments of this invention differently than herein described. Such variations and implementations are understood to be captured according to the following claims.

I claim:

1. A hand-hygiene compliance monitoring system comprising:
    a hand-hygiene monitor having a visible indicator of elapsed time and a wireless signal receiver, said hand-hygiene monitor adapted to be secured to a person so that the visible indicator of elapsed time is viewable by others looking at the person;
    a hand-sanitization station having a wireless signal transmitter and means for cleaning hands of a user; and
    a point-of-sale ("POS") system to compute a cost of products selected for purchase and to conduct a commercial transaction to accept payment of the cost, wherein
    the hand-hygiene monitor and the hand-sanitization station interact via a signal transmitted from the hand-sanitization station to the hand-hygiene monitor so that the hand-hygiene monitor displays the visible indicator of elapsed time since the signal was transmitted from the hand-sanitization station to the hand-hygiene monitor, and
    the POS system adjusts the cost of products selected based on information from the hand-hygiene monitor or the hand-sanitization station.

2. The hand-hygiene compliance monitoring system of claim 1, further comprising:
    a location beacon having a wireless signal transmitter, wherein
    the location beacon transmits a signal that is received by the hand-hygiene monitor, and
    the hand-hygiene monitor records the signal from the location beacon.

3. The hand-hygiene compliance monitoring system of claim 2 wherein the hand-hygiene monitor alters the visible indicator of elapsed time after receiving the signal from the location beacon.

4. The hand-hygiene compliance monitoring system of claim 1 wherein the means for cleaning hands of a user is a dispenser of a substance chosen from the group consisting of alcohol-based sanitizer, soap, detergent, antibacterial soap and antibacterial detergent.

5. The hand-hygiene compliance monitoring system of claim 1 wherein the means for cleaning hands of a user is a ultraviolet light source.

6. The hand-hygiene compliance monitoring system of claim 1 wherein the adjusting by the POS system is to reduce the cost of products selected if the information from the hand-hygiene monitor or the hand-sanitization station indicates that a user of the hand-hygiene monitor interacted with a hand-sanitization station at least a predetermined number of times.

7. The hand-hygiene compliance monitoring system of claim 1 wherein the adjusting by the POS system is to reduce the cost of products selected if the information from the hand-hygiene monitor or the hand-sanitization station indicates that a user of the hand-hygiene monitor interacted with a hand-sanitization station no less frequently than once in every predetermined period of time.

\* \* \* \* \*